United States Patent Office 3,446,695
Patented May 27, 1969

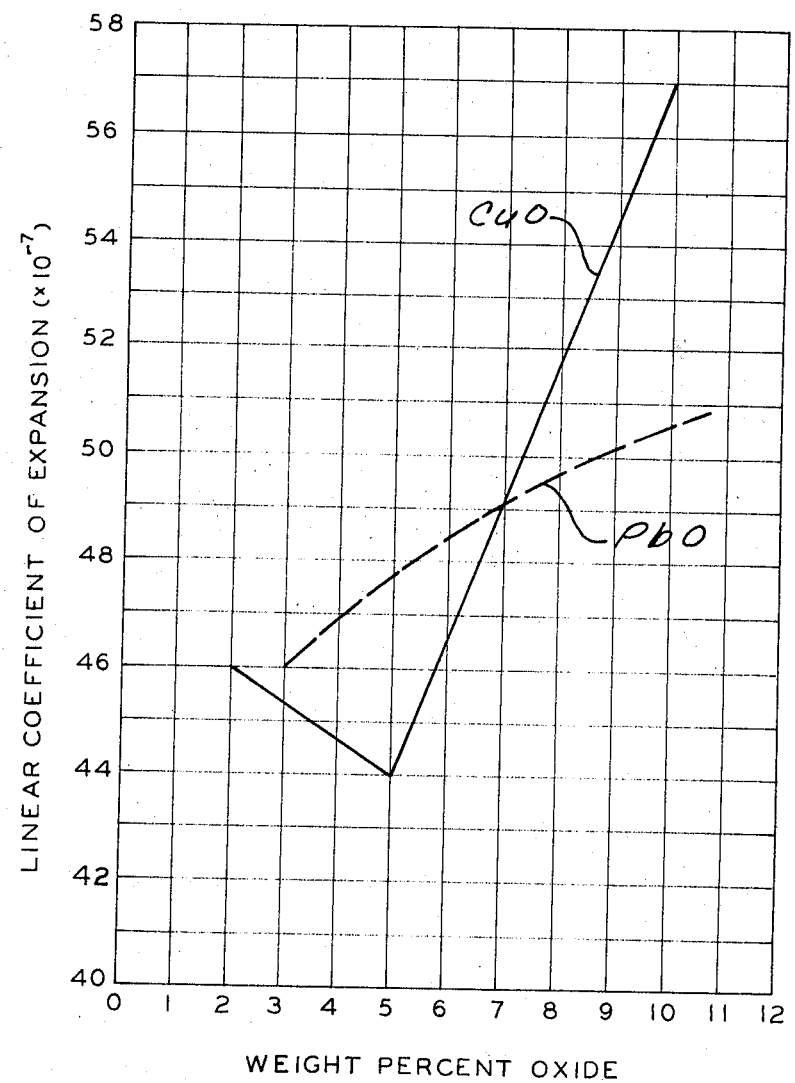

3,446,695
VANADIUM-ZINC BORATE SOLDER GLASSES
Bhogaraju V. Janakirama-Rao, Toledo, Ohio, assignor to Owens-Illinois, Inc., a corporation of Ohio
Filed Oct. 3, 1966, Ser. No. 583,799
Int. Cl. B32b 17/06, 15/04
U.S. Cl. 161—192                 11 Claims The present invention pertains to novel glass compositions, and more particularly, the instant invention pertains to vitreous sealing glass compositions for fabricating glass-to-glass or glass-to-metal seals. Specifically, the instant invention pertains to vitreous sealing glass compositions having a relatively low thermal coefficient of expansion and a relatively low fiber softening point temperature.

The art of forming glass-to-glass or glass-to-metal seals is fraught with many problems. Among the problems faced in the sealing art is the poor mismatch of the coefficients of thermal expansion of the solder glass sealant with the sealable base glass or metal. Another problem is the inability of the sealing glass composition to intimately fuse to the sealable surface at a substantially lower fusible temperature than the deformation or distortion temperature of said sealable glass or metal. Accordingly, it will be appreciated by those versed in the art that a solder glass possessing an effective coefficient of expansion which is essentially equal to the coefficient of expansion of the surfaces to be bonded and suitable for fabricating satisfactory seals represents a valuable contribution to the sealing art. Also, it will be appreciated by those skilled in the art that solder glass compositions possessing low fiber softening point temperatures which lend themselves to successful sealing procedures would represent a contribution to the art and have a positive economic value.

Accordingly, it is an object of the present invention to provide novel glass compositions.

A further object of the invention is to provide novel solder glass compositions.

It is a further object of the present invention to provide solder glasses having a relatively low coefficient of thermal expansion.

Yet a further object of the present invention is to provide solder glasses suitable for sealing to metals and or glass possessing a relatively low coefficient of thermal expansion.

Another object of the present invention is to provide solder glasses having a relatively low fiber softening point temperature.

Yet a further object of the invention is to provide glass-to-glass or glass-to-metal seals.

Other objects, as well as advantages of the instant invention, will become apparent from a consideration of the accompanying specification and claims, as well as in connection with the accompanying drawing.

According to the present invention there is provided a family of vitreous sealing glass compositions having an expansion coefficient (0–300° C.), in the range of 40 to $50 \times 10^{-7}$ in./in./° C. and a fiber softening point temperature of about 525 to 575° C. The glass compositions of the present invention are based on a $ZnO\text{-}B_2O_3$ system in which $V_2O_5$ is substituted for part of ZnO to produce a $V_2O_5\text{-}ZnO\text{-}B_2O_3$ glass system which latter system can also include the glass forming oxides CuO, PbO, $SiO_2$ and $Al_2O_3$. The novel subject glasses of the instant invention generally contain 5 to 30 weight percent $V_2O_5$, 20 to 40 weight percent $B_2O_3$, 40 to 60 weight percent ZnO and 1 to 10 weight percent CuO. In addition, the $V_2O_5\text{-}ZnO\text{-}B_2O_3$ glass system can contain 0 to 7.5 weight percent PbO, 0 to 0.2 weight percent F, 0 to 10 weight percent $SiO_2$ and 0 to 10 weight percent $Al_2O_3$.

Exemplary vitreous glasses of the subject invention are the following: (a) a glass containing 5 to 15 weight percent $V_2O_5$, 20 to 30 weight percent $B_2O_3$, 40 to 60 weight percent ZnO and 2 to 10 weight percent CuO; (b) a vitreous solder glass consisting essentially of 5 to 15 weight percent $V_2O_5$, 20 to 30 weight percent $B_2O_3$, 40 to 60 weight percent ZnO, 2 to 10 weight percent CuO, and 1 to 7.5 weight percent PbO; (c) a vitreous glass composition consisting essentially of 5 to 15 weight percent $V_2O_5$, 20 to 30 weight percent $B_2O_3$, 40 to 60 weight percent ZnO, 2 to 10 weight percent CuO, 1 to 7.5 weight percent PbO and 0.2 to 1 weight percent $PbF_2$; (d) a glass consisting essentially of 5 to 15 weight percent $V_2O_5$, 20 to 30 weight percent $B_2O_3$, 40 to 60 weight percent ZnO, 2 to 10 weight percent CuO, 1 to 7.5 weight percent PbO, 1 to 5 weight percent $SiO_2$; (e) a vitreous solder glass containing 8 to 10 weight percent $V_2O_5$, 24 to 30 weight percent $B_2O_3$, 50 to 60 weight percent ZnO, 2 to 5 weight percent CuO, 1 to 5 weight percent $SiO_2$ and 1 to 3 weight percent PbO; (f) a vitreous solder glass containing 5 to 15 weight percent $V_2O_5$, 20 to 30 weight percent $B_2O_3$, 40 to 60 weight percent ZnO and 2 to 10 weight percent CuO; (g) a vitreous solder glass containing 5 to 30 weight percent $V_2O_5$, 20 to 40 weight percent $B_2O_3$, 40 to 60 weight percent ZnO and 1 to 7.5 weight percent PbO; and a glass consisting essentially of 8 to 10 weight percent $V_2O_5$, 24 to 30 weight percent $B_2O_3$, 50 to 60 weight percent ZnO, 2 to 5 weight percent CuO, 1 to 5 weight percent $SiO_2$ and 1 to 3 weight percent PbO; (h) a vitreous solder glass containing 5 to 15 weight percent $V_2O_5$, 20 to 30 weight percent $B_2O_3$, 40 to 60 weight percent ZnO and 2 to 10 weight percent CuO; (i) a vitreous solder glass containing 5 to 30 weight percent $V_2O_5$, 20 to 40 weight percent $B_2O_3$, 40 to 60 weight percent ZnO and 1 to 7.5 weight percent PbO; (j) and a glass consisting essentially of 8 to 10 weight percent $V_2O_5$, 24 to 30 weight percent $B_2O_3$, 50 to 60 weight percent ZnO and 3 to 5 weight percent PbO.

In a particular and important embodiment of the subject invention there are provided glass compositions having a coefficient of thermal expansion (0 to 300° C.) of about 44 to $50 \times 10^{-7}$ in./in./° C. and a fiber softening point temperature of 525 to 575° C. The glass compositions possessing this low coefficient of thermal expansion and low fiber softening point temperature appear to be unobvious since, by comparison, a composition containing 60 weight percent ZnO and 40 weight percent $B_2O_3$ has a coefficient of expansion of $50 \times 10^{-7}$ in./in./° C. and a fiber softening point of 650° C. It has now unexpectedly been found that the replacement of part of ZnO by $V_2O_5$ to give a $ZnO\text{-}B_2O_3\text{-}V_2O_5$ system and the addition of CuO or PbO to the newly formed $ZnO\text{-}B_2O_3\text{-}V_2O_5$ system lowers the fiber softening point to less than 575° C. and at the same time substantially decreases the coefficient of thermal expansion to less than $50 \times 10^{-7}$ in./in./° C. This dual behavior appears to be exceptional and is not seen to be common for ordinary glass systems. Generally, the coefficient of expansion of the present glasses will be in the range of 44 to $48 \times 10^{-7}$ in./in./° C. and the fiber softening point temperature for said glasses in the range of 525 to 575° C. The addition of PbO in the amounts up to 5 weight percent to the $ZnO\text{-}B_2O_3\text{-}V_2O_5$ system does not materially change the linear coefficient of thermal expansion of the glass system while larger amounts, generally, in excess of 10 weight percent PbO, tends to increase the coefficient of thermal expansion. The addition of PbO to the same system in amounts up to about 7.5 weight percent tends to lower the fiber softening point temperature. The addition of PbO, generally in amounts up to 7.5 weight percent, to the $ZnO\text{-}B_2O_3\text{-}V_2O_5\text{-}CuO$ glass tends to produce a glass characterized by both a decreased coefficient of thermal expansion in the range of 44 to $50 \times 10^{-7}$ in./in./° C. and softening point temperature in the range of 525 to 575° C. The changes in the coefficient of thermal expansion produced by the addition of CuO or PbO to the $ZnO$-$B_2O_3$-$V_2O_5$ system are further set forth in the accompanying drawing.

In preparing the novel vitreous sealing glass compositions of the present invention, the batch ingredients are intimately mixed by hand, or in a commercially available blender, and heated to a temperature such that all the glass forming substances are present in a molten state, thereby enabling the formation of a glass from a homogeneous melt. Generally, the batch ingredients were well mixed by hand and melting was done in a 90% platinum —10% rhodium or fused silica crucible, in an electric furnace at about 1100° C. to 1300° C., for about ¼ to 2 hours in an air atmosphere. The batch ingredients were continuously stirred and agitated during the melting and heating procedures.

The batch materials employed for preparing the glasses of the subject invention were of a high degree of purity and were selected from the following commercially available materials: silicon dioxide ($SiO_2$) Kona Quintus Quartz or Ottawa Sand, aluminum oxide ($Al_2O_3$) Alcoa A–14 or aluminum trihydroxide, zinc oxide (ZnO), vanadium pentoxide ($V_2O_5$), cupric oxide (CuO), cuprous oxide ($Cu_2O$), lead fluoride ($PbF_2$), lead oxide (PbO) and boric acid ($H_3BO_3$). Of course, functionally equivalent oxides, carbonates, fluorides, silicates, or any other form which does not disturb or adversely effect the subject glass composition may be utilized for forming the subject glasses.

Example 1

A vitreous sealing glass composition was prepared by intimately blending 10 grams of $V_2O_5$, 53.3 grams of $H_3BO_3$, 58 grams of ZnO and 2 grams of CuO to obtain a substantially homogeneous mixture and then melting the mixture in an electric heated furnace, in a platinum crucible at about 1000° C. to 1100° C., for about 1 hour. The theoretical composition for the glass thus produced is 10 weight percent $V_2O_5$, 30 weight percent $B_2O_3$, 58 weight percent ZnO and 2 weight percent CuO. The glass had a coefficient of thermal expansion of $46 \times 10^{-7}$ in./in./° C. and a fiber softening point temperature of 575° C.

The following table, Table No. 1, lists representative batch compositions, Examples No. 2 to Example No. 13, which were melted and formed into vitreous solder glass compositions according to the mode and manner of the present invention; that is, the ingredients were well-mixed and melted in a platinum-rhodium crucible at about 1000° C. for about 1 hour and with constant stirring during the melting and forming procedure.

In Table No. 2, immediately below, is listed the oxides, expressed in weight percent, and physical characteristices for each glass prepared from the batch ingredients set forth as Examples 2 to 13 in Table No. 1 above. The examples corresponding to those glasses are set forth as Examples No. 14 to 25 respectively. In Table 2 F.S.P. is used to designate the fiber softening point and $\alpha(0\text{--}300°\ C.) \times 10^{-7}$ represents the linear coefficient of thermal expansion in in./in./° C.

TABLE 2.—COMPOSITION, WEIGHT PERCENT

| Component | Example No. | | | | | | | | | | | |
|---|---|---|---|---|---|---|---|---|---|---|---|---|
| | 14 | 15 | 16 | 17 | 18 | 19 | 20 | 21 | 22 | 23 | 24 | 25 |
| $V_2O_5$ | 10 | 9.5 | 9 | 10 | 9.5 | 9 | | 10 | 20 | 30 | 9.5 | 17 |
| $B_2O_3$ | 29 | 28.5 | 27 | 29 | 28.5 | 27 | 40 | 30 | 25 | 20 | 28.6 | 25 |
| ZnO | 58 | 57 | 54 | 58 | 57 | 54 | 60 | 60 | 55 | 50 | 57.1 | 55 |
| CuO | 3 | 5 | 10 | | | | | | | | 2.4 | |
| PbO | | | | 3 | 5 | 10 | | | | | 1.9 | |
| $SiO_2$ | | | | | | | | | | | 0.5 | 3 |
| $Al_2O_3$ | | | | | | | | | | | | 48 |
| $\alpha(0\text{--}300°\ C.) \times 10^{-7}$ | 45 | 44 | 57 | 46 | 48 | 50 | 45 | 47 | 49 | 51 | 45 | 553 |
| F.S.P. | 575 | 570 | 560 | 570 | 560 | 550 | 650 | 575 | 525 | 480 | 575 | |

The glass compositions of the instant invention are used as vitreous solder glass sealants for assembling glass-to-glass or glass-to-metal parts by conventional methods known to the art. The vitreous sealing glasses can be applied by both the hot and cold sealing techniques. When the cold procedure is employed, the solder glass composition is ground and mixed with a suitable vehicle to form a paste. One acceptable vehicle is composed of about 1 to 3%, usually about 1 to 2% nitrocellulose in amyl acetate. Other acceptable organic binders or vehicles may be employed provided they will readily burn off and volatize during the heating procedure in the thermal sealing of the preformed parts. In addition, the selected organic binder should not react with any of the elements making up the bonded assembly. Among examples of other organic binders which can be used are those which include gelatin dissolved in water, nitrocellulose and butyl acetate, camphor with cellulose, and the like.

The vitreous solder glass composition, mixed with the vehicle, can be manually or mechanically applied by using a spatular, extrusion, cold, dip brush, roller coat, spray, doctor blade or any like means. In the extrusion procedure, a toothpaste-like mixture of solder glass and carrier can be used to apply a uniform layer along at least one of the edges to be sealed.

After coating at least one of the surfaces to be sealed with the vitreous sealing glasses of the invention and employing any of the sealing techniques discussed supra, the coated parts can be dried in an oven or by any suitable heating procedure. Next, the dry assembled parts are intimately bonded in an oven or by any suitable heat procedure and finally cooled to room temperature.

The following examples are illustrative of glass-to-glass or glass-to-metal seals which were fabricated with vitreous sealing glass compositions of the subject invention.

Example 26

A butt seal was effected with a vitreous solder glass of the instant invention wherein the solder glass was formed into a glass rod and consisted essentially of 9.5 weight percent $V_2O_5$, 28.6 weight percent $B_2O_3$, 57.1 weight percent ZnO, 2.4 weight percent CuO, 1.9 weight

TABLE 1.—BATCH GRAMS

| Ingredient | Examples | | | | | | | | | | | |
|---|---|---|---|---|---|---|---|---|---|---|---|---|
| | 2 | 3 | 4 | 5 | 6 | 7 | 8 | 9 | 10 | 11 | 12 | 13 |
| $V_2O_5$ | 10 | 9.5 | 9 | 10 | 9.5 | 9 | | 10 | 20 | 30 | 9.5 | 17 |
| $H_3BO_3$ | 51.5 | 50.6 | 48 | 51.5 | 50.6 | 48 | 71 | 53.3 | 44.4 | 35.5 | 50.8 | 44.4 |
| ZnO | 58 | 57 | 54 | 58 | 57 | 54 | 60 | 60 | 55 | 50 | 57.1 | 55 |
| CuO | 3 | 5 | 10 | | | | | | | | 2.4 | |
| PbO | | | | 3 | 5 | 10 | | | | | 1.9 | |
| Al(OH)$_3$ | | | | | | | | | | | | 4.5 |
| $SiO_2$ | | | | | | | | | | | 0.5 | | percent PbO, and 0.5 weight percent SiO₂ and possessed a coefficient of expansion of 45×10⁻⁷ in./in./°C. The rod was ground on one of its ends to a flat planar surface by polishing said end on a 120 grit alundum polishing wheel. The resulting polished end rod was sealed in a gas-oxygen flame to a piece of glass rod that was made from a glass consisting essentially of 64.5 weight percent SiO₂, 18.4 weight percent B₂O₃, 7.5 weight percent Al₂O₃, 3.3 weight percent K₂O, 2.2 weight percent Na₂O, 2.8 weight percent BaO and 0.6 weight percent Li₂O and having a linear coefficient of thermal expansion of about 47×10⁻⁷ in./in./°C. (0–300° C.). The seal stress for the seal formed was about 150 p.s.i., tension.

Example 27

A seal was effected by intimately bonding to a glass rod made of 64.8 weight percent SiO₂, 22.2 weight percent B₂O₃, 4.9 weight percent Al₂O₃, 0.1 weight percent K₂O, 7.3 weight percent Na₂O, 0.2 weight percent CaO±MgO, 0.5 weight percent Fe₂O₃ and 0.4 weight percent CeO₂ and having a linear coefficient of thermal expansion of about 50×10⁻⁷ in./in./°C. (0–300° C.) a solder glass rod made of 9.5 weight percent V₂O₅, 28.6 weight percent B₂O₃, 57.1 weight percent ZnO, 2.4 weight percent CuO, 1.9 weight percent PbO and 0.5 weight percent SiO₂ and having a coefficient of thermal expansion of about 45×10⁻⁷ in./in./°C. (0–300° C.) by heating in a gas-oxygen flame the ends of the two rods which were previously placed in intimate contact. The glass rods, or their respective ends, were ground to a flat planar end surface before the solder glass rod was finally sealed to the first-mentioned rod. The measured seal stress was about 850 p.s.i. compression.

Example 28

Other seals were made employing the glass rods and sealing glasses of Example 26 and Example 27. In effecting these seals an electric furnace was used for sealing and the heating rate was about 10° C. per minute. The seals were made at 607° C. for one hour, and were cooled at the rate of 5° C. per minute. The stress was measured and was as reported in the respective example supra.

Example 29

A glass-to-metal seal was made by bonding a vitreous sealing glass rod to a piece of Kovar metal. The sealing glass rod, consisting of 9.5 weight percent V₂O₅, 28.6 weight percent B₂O₃, 57.1 weight percent ZnO, 2.4 weight percent CuO, 1.9 weight percent PbO and 0.5 weight percent SiO₂ and having a coefficient of thermal expansion of about 45×10⁻⁷ in./in./°C. was ground to a flat planar surface on at least one of the ends and placed in intimate contact with a piece of Kovar metal. As is well known, Kovar is a trade-name for an alloy having the approximate composition, iron 54 weight percent, nickel 29 weight percent and cobalt 17 weight percent. The seal was made using a radio frequency generator, at 2100° F., and holding time of 25 seconds. The resulting seal was annealed in a tube furnace at 850° F. for 15 minutes. After cooling to room temperature, the seal was ground and the surface upon being examined under a microscope appeared to be essentially-free of cracks. Next, the seal was immersed in boiling water for 15 seconds and then in 0° C. water for 15 seconds. The seal was then re-examined under the microscope and no cracks were observed. The immersion process was reversed and again no cracks were found upon microscopic examination. The seal stress appeared to be less than 500 p.s.i. tension.

Example 30

A glass-to-metal seal was made by intimately bonding a vitreous sealing glass rod to a piece of Kovar alloy. The sealing glass rod, consisting essentially of 17 weight precent V₂O₅, 25 weight percent B₂O₃, 55 weight percent ZnO and 3 weight percent Al₂O₃, and having a coefficient of thermal expansion of 48×10⁻⁷ in./in./°C. (0–300° C.), was first ground on at least one of its ends to a flat planar surface. The ground end was then placed in intimate contact with a piece of Kovar alloy. All other conditions and procedures were as described in Example 29. The seal stress was about 1500 p.s.i. tension.

Example 31

A glass-to-glass seal was made by intimately bonding a glass rod consisting of 64.5 weight percent SiO₂, 18.4 weight percent B₂O₃, 7.5 weight percent Al₂O₃, 3.3 weight percent K₂O, 2.2 weight percent Na₂O, 0.1 weight percent CaO+MgO, 2.8 weight percent BaO and 0.6 weight percent to a vitreous glass sealing rod consisting of 17 weight percent V₂O₅, 25 weight percent B₂O₃, 55 weight percent ZnO, and 3 weight percent Al₂O₃ by placing the ends of said rods in intimate contact and heating for 1 hour at 550–555° C. The seal was cooled at the rate of 5° C. per minute. The stress, after cooling, was 1000 p.s.i. compression.

The stress measurements were made by measuring the retardation of polarized light by means of a polarimeter. The retardation data was then used to calculate the stress in lbs. per square inch by the following well-known relationship $$S = \frac{R \times K}{l}$$

wherein S is the stress in p.s.i., R is the retardation in millimicrons, $l$ is the path of light in cm., and K is the factor 14.22 over the optical coefficient expressed in mu/cm./kg./cm.²

The vitreous sealing glasses of the instant invention can be used to fabricate items of commerce. For example, alloy lead-in conductors can be sealed to a glass encapsulating structure for effecting low seals in the vacuum sealing industry and the like.

The term "metal" as used herein includes metals, metallic alloys, and intermetallic compounds. The notation "p.s.i." as used herein means pounds per square inch.

I claim:

1. A vitreous solder glass composition wherein said glass consists essentially of 5 to 30 weight percent V₂O₅, 20 to 40 weight percent B₂O₃, 40 to 60 weight percent ZnO, 1 to 10 weight percent CuO, 0 to 7.5 weight percent PbO, 0 to 10 weight percent SiO₂, 0 to 10 weight percent Al₂O₃, and 0 to 0.2 weight percent PbF₂ and wherein said solder glass composition having a fiber softening point temperature of 525 to 575° C., and coefficient of thermal expansion of 40 to 50×10⁻⁷ (0–300° C.).

2. A vitreous solder glass according to claim 1 wherein said glass consists essentially of 5 to 15 weight percent V₂O₅, 20 to 30 weight percent B₂O₃, 40 to 60 weight percent ZnO and 2 to 10 weight percent CuO.

3. A vitreous solder glass according to claim 2 wherein said glass contains from 2 to 8 weight percent CuO and has a coefficient of thermal expansion of 44 to 48×10⁻⁷ (0–300° C.).

4. A vitreous solder glass according to claim 1 wherein said glass consists essentially of 5 to 15 weight percent V₂O₅, 20 to 30 weight percent B₂O₃, 40 to 60 weight percent ZnO, 2 to 10 weight percent CuO and 1 to 7.5 weight percent PbO.

5. A vitreous solder glass according to claim 1 wherein said glass consists essentially of 5 to 15 weight percent V₂O₅, 20 to 30 weight percent B₂O₃, 40 to 60 weight percent ZnO, 2 to 10 weight percent CuO, 1 to 7.5 weight percent PbO and 1 to 0.2 weight percent PbF₂.

6. A vitreous solder glass according to claim 1 wherein said glass consists essentially of 5 to 15 weight percent V₂O₅, 20 to 30 weight percent B₂O₃, 40 to 60 weight percent ZnO, 2 to 10 weight percent CuO, 1 to 7.5 weight percent PbO and 1 to 5 weight percent SiO₂.

7. A vitreous solder glass according to claim 6 wherein said glass consists essentially of 8 to 10 weight percent V₂O₅, 24 to 30 weight percent B₂O₃, 50 to 60 weight percent ZnO, 2 to 5 weight percent CuO, 1 to 3 weight percent $SiO_2$ and 1 to 3 weight percent PbO.

8. A vitreous solder glass composition wherein said glass consists essentially of 5 to 30 weight percent $V_2O_5$, 20 to 40 weight percent $B_2O_3$, 40 to 60 weight percent ZnO and 1 to 7.5 weight percent PbO and wherein said glass has a fiber softening point of 525 to 575° C., and a coefficient of expansion of 40 to $50 \times 10^{-7}$ (0–300° C.).

9. A vitreous solder glass composition according to claim 8 wherein said glass consists essentially of 8 to 10 weight percent $V_2O_5$, 24 to 30 weight percent $B_2O_3$, 50 to 60 weight percent ZnO and 3 to 5 weight percent PbO.

10. A composite article comprising preformed components and a layer of vitreous solder glass between said components and integrally bonded thereto, said vitreous solder glass consisting essentially of 5 to 30 weight percent $V_2O_5$, 20 to 40 weight percent $B_2O_3$, 40 to 60 weight percent ZnO, 1 to 10 weight percent CuO, 0 to 7.5 weight percent PbO, 0 to 10 weight percent $SiO_2$, 0 to 0.2 weight percent $PbF_2$ and wherein said vitreous sealing glass has a fiber softening point of 525° to 575° C. and a coefficient of thermal expansion of 40 to $50 \times 10^{-7}$ (0–300° C.).

11. Composite article comprising preformed components and a layer of a vitreous solder glass between said components and wherein said components have a thermal coefficient of thermal expansion sufficiently complemental to permit their integral bonding to said solder glass which consists essentially of 5 to 30 weight percent $V_2O_5$, 20 to 40 weight percent $B_2O_3$, 40 to 60 weight percent ZnO and 1 to 7.5 weight percent PbO and wherein said solder glass has a fiber softening point temperature of 525° C. to 575° C. and a coefficient of thermal expansion of 40 to $50 \times 10^{-7}$ (0–300° C.).

References Cited

UNITED STATES PATENTS 3,063,198 11/1962 Babcock _____ 106—39 X
3,088,833 5/1963 Pirooz _____ 106—53

HELEN M. McCARTHY, *Primary Examiner.*

W. R. SATTERFIELD, *Assistant Examiner.*

U.S. Cl. X.R.

65—43, 59; 106—47, 53, 54; 161—193, 196